United States Patent [19]

Shima et al.

[11] 4,267,733

[45] May 19, 1981

[54] TORSIONAL VIBRATION MONITORING METHOD AND AN APPARATUS FOR PERFORMING THE SAME

[75] Inventors: Ichiji Shima; Tatsuo Yamamoto; Shigeru Yoshibayashi; Hiroshi Teshima, all of Amagasaki; Akio Hizume, Tokyo; Tetsuo Iki, Nagasaki; Takashi Yamamoto, Nishisonogi; Kyozo Kanamori, Isahaya; Kenzo Noguchi; Shinobu Kishikawa, both of Nagasaki, all of Japan

[73] Assignees: The Kansai Electric Power Co. Inc., Osaka; Mitsubishi Jukogyo Kabushiki Kaisha, Tokyo, both of Japan

[21] Appl. No.: 43,679

[22] Filed: May 30, 1979

[30] Foreign Application Priority Data

Jun. 1, 1978 [JP] Japan .................................. 53-66143

[51] Int. Cl.$^3$ ............................................... G01H 1/10
[52] U.S. Cl. ....................................... 73/650; 73/660
[58] Field of Search .................. 73/650, 593, 658, 660

[56] References Cited

U.S. PATENT DOCUMENTS 3,934,459  1/1976  Wolfinger et al. ..................... 73/650
4,051,427  9/1977  Kilgore et al. ........................ 73/650

Primary Examiner—Stephen A. Kreitman
Attorney, Agent, or Firm—Toren, McGeady and Stanger

[57] ABSTRACT

The present invention is a torsional vibration monitoring method and an apparatus for performing the same, in which torsional vibrations produced in a rotating shaft system for use in such as a turbine generator are measured at a small number of certain positions therealong at which the measurements are possible, the torsional vibrations are linearly decomposed and torsional vibrations at arbitrary positions on the rotating shaft system are estimated from the linear decompositions.

2 Claims, 10 Drawing Figures

FIG. 2
FIG. 2A
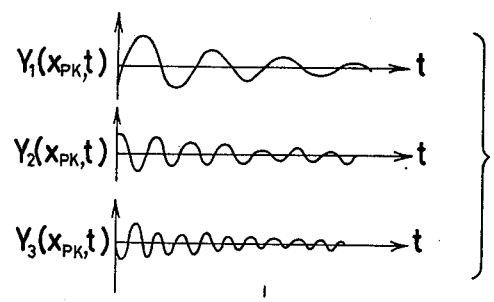
FIG. 2B
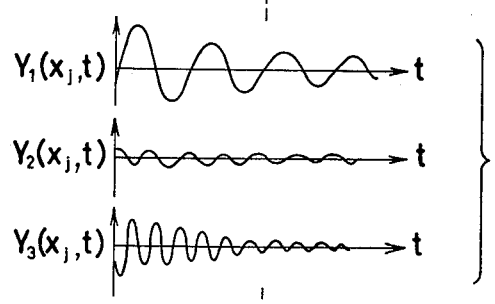
FIG. 2C
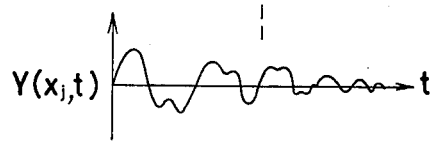
FIG. 2D
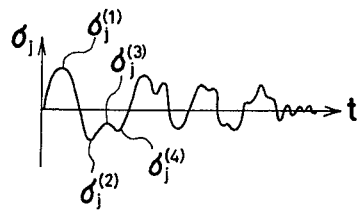
FIG. 2E

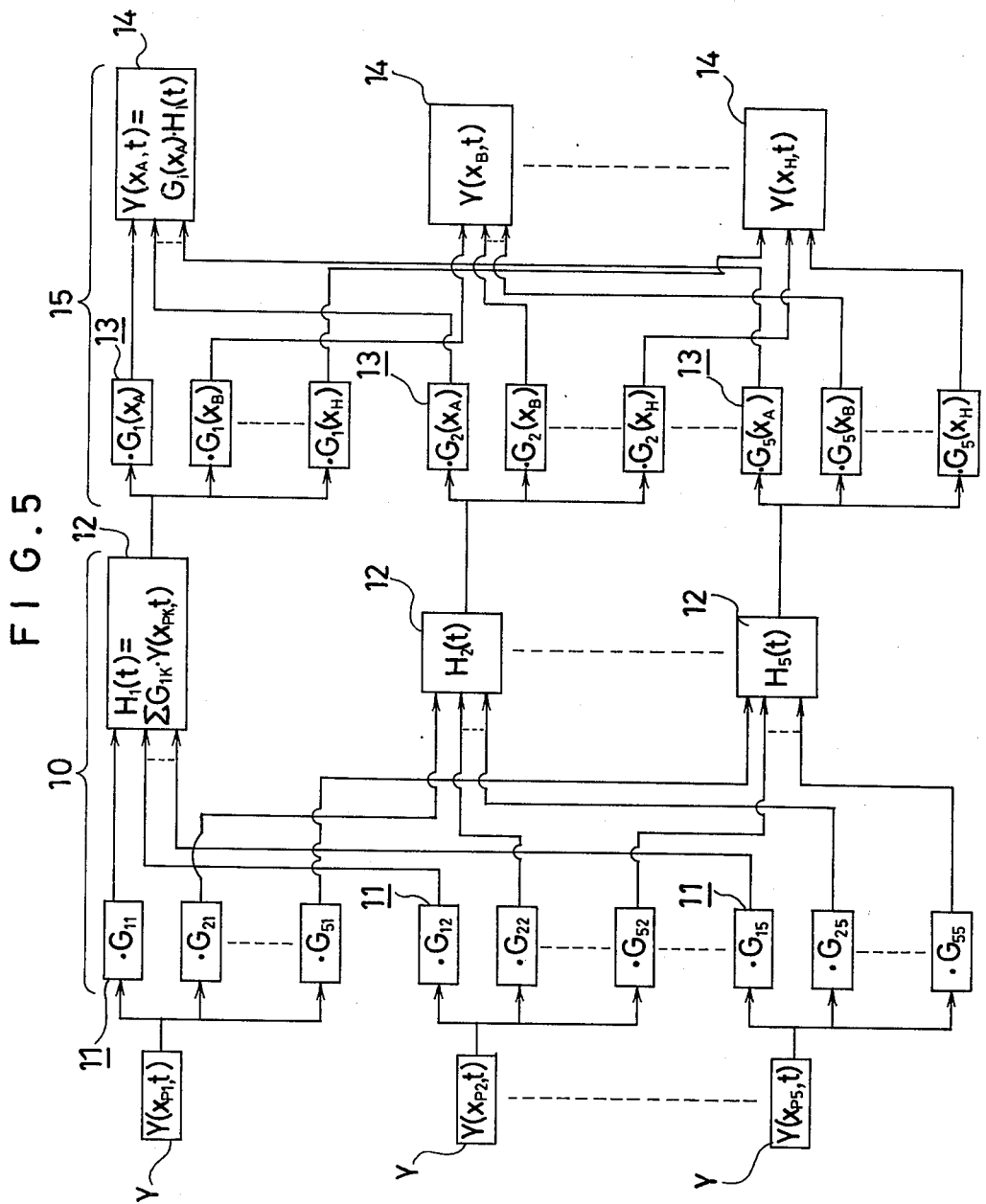

TORSIONAL VIBRATION MONITORING METHOD AND AN APPARATUS FOR PERFORMING THE SAME

BACKGROUND OF THE INVENTION

The present invention relates to a method of monitoring torsional vibration produced in a rotating shaft system for use in a device such as a turbine generator which comprises the steps of measuring torsional vibrations produced in the rotating shaft system at a small number of certain positions on the shaft system at which the measurements of the torsional vibrations are possible, linearly decomposing the measured torsional vibrations and estimating torsional vibrations at other arbitrary positions on the rotating shaft system from the estimations, and to an apparatus for performing the same.

DESCRIPTION OF THE PRIOR ART

It has been commonly recognized that, in designing a rotating shaft system for use in devices such as a turbine generator, compressor or marine diesel engine, it is important to exactly know various disturbances affecting the rotating shaft system and, particularly, it is very important for operators of the rotating shaft system to know a fatigue life expenditure of the rotating shaft system which may vary time to time with the disturbances. Since, however, the length of the rotating shaft system of, for example, the turbine generator is generally very long and may become several tens of meters in some cases, it is necessary to set a number of measuring points along the rotating shaft system although torsional vibrations occurring along the rotating shaft system must be measured because it may show attributes to the fatigue damage of the shaft system, it is disadvantageous economically to install torsional vibration measuring devices at a large number of positions on the rotating shaft system and it is sometimes impossible physically to do so.

SUMMARY OF THE INVENTION

The present invention is intended to overcome the above described disadvantages of the conventional torsional vibration measuring system and an object of the present invention is to provide a method of monitoring torsional vibrations in a rotating shaft system in which torsional vibrations at arbitrary positions on the rotating shaft system are estimated by linearly decomposing torsional vibrations detected at certain n positions on the rotating shaft system, and to provide an apparatus for performing the same method. In order to achieve the above object, the present invention utilizes the fact that the torsional vibration occurring in the rotating shaft system is composed of a sum of modal vibrations and that each modal vibration is composed of a product of a vibration mode type and a vibration mode component. In the present invention, an assumption is made that the torsional vibration is an accumulation of the modal vibrations up to the n-th order. On the basis of the above facts and the assumption, torsional vibrations at n certain positions on the rotating shaft system are measured. Then the following n simultaneous equations each containing the known vibration mode types obtained at each of the n certain positions and unknown vibration mode component are resolved to obtain the unknown vibration mode components.

$$Y(x_{pk},t) = \Sigma G_i(x_{pk}) \cdot H_i(t) \quad (k=1, 2 \ldots n)$$

where $Y(x_{pk},t)$ is torsional vibrations at n certain positions $x_{pk}$, $G_i(x_{pk})$ is vibration mode types at n certain positions $x_{pk}$ and $H_i(t)$ is vibration mode components.

Then a torsional vibration $Y(x_j,t)$ at an arbitrary position $x_j$ on the rotating shaft system is determined as an accumulation of products of a vibration mode type $G_i(x_j)$ and a vibration mode component $H_i(t)$ up to n-th order, as represented below.

$$Y(x_j,t) = \Sigma G_i(x_j) \cdot H_i(t)$$

Furthermore, in order to achieve the above object, there is provided the apparatus for monitoring torsional vibration of the rotating shaft system and it is based on an idea in which the torsional vibration occurring in the rotating shaft system is composed of a sum of modal vibrations and each modal vibration is composed of a product of a vibration mode type and a vibration mode component, and said apparatus is provided in measuring the torsional vibration at the arbitrary positions from the torsional vibration detected at the certain position in the rotating shaft system and the improvement thereof is comprised that n sets of detectors of detecting torsional vibrations at each of n certain positions on the rotating shaft system, a matrix arithmetic unit for multiplying previously obtained n sets of n constants to the n sets of torsional vibration obtained by said detectors respectively and adding the results of the multiplications to obtain n vibration mode components and a modal arithmetic unit for multiplying the n vibration mode components to vibration mode types at arbitrary position on the rotating shaft system and adding them to obtain torsional vibrations at the arbitrary positions.

In other words, the present invention is based on knowledge of the vibration theory. According to such knowledge, torsional vibration $Y(x,t)$ of the rotating shaft system can be represented by an accumulation of modal vibration $Y_i(x,t)$ and the latter can be represented by a product of vibration mode type $G_i(x)$ and vibration mode component $H_i(t)$, as follows:

$$Y(x,t) = \Sigma Y_i(x,t) \tag{1}$$
$$= \Sigma G_i(x) \cdot H_i(t) \tag{2}$$

The vibration mode type $G_i(x)$ can be plotted as shown in FIG. 1, since, when i is infinite, $|G_i(x)| \approx 0$, a suitable finite number n is selected, so that the following equation is established.

$$Y(x,t) = \sum_{i=1}^{n} G_i(x) \cdot H_i(t) \tag{3}$$

From equation (3), the torsional vibration $Y(x_{pk}, t)$ at the certain position $x_{pk}$ becomes as follows:

$$Y(x_{pk},t) = \sum_{i=1}^{n} G_i(x_{pk}) \cdot H_i(t) \tag{4}$$

where $k = 1, 2, \ldots n$.

On the other hand, since it is clear from FIG. 1 that the value of $G_i(x_{pk})$ in the equation (4) is predetermined according to the position on the rotating shaft system, the equation (4) becomes the n-th dimension simultaneous equation of the n-th degree containing n vibration mode components $H_i(t)$ as variables, which is as follow:

$$(Y(x_{pk},t)) = (G_i(x_{pk})) \cdot (H_i(t)) \tag{5}$$

By suitably selecting the certain position ($x_{pk}$), the matrix ($G_i(x_{pk})$) in the equation (5) becomes not zero and thus there is a reverse matrix thereof. By obtaining the reverse matrix and putting components of the reverse matrix as $G_{ik}$, the vibration mode component $H_i(t)$ becomes as follows:

$$H_i(t) = \sum_{k=1}^{n} G_{ik} \cdot Y(x_{pk},t) \tag{6}$$

where i shows the row and k shows the column. Therefore, since, assuming an arbitrary position $x_j$, the respective vibration mode types $G_i(x_j)$ at the arbitrary position are known and the vibration mode component $H_i(t)$ are defined by the equation (6), the torsional vibration $Y(x_j,t)$ at the arbitrary position $x_j$ can be estimated as follows:

$$Y(x_j,t) = \sum_{i=1}^{n} G_i(x_j) \cdot H_i(t) \tag{7}$$

BRIEF DESCRIPTION OF THE DRAWING

FIG. 2 shows various waveforms of torsional vibrations occurring in the rotating shaft system, in which FIG. 2A is a torsional vibration waveform at a certain position $Y(x_{pk},t)$, FIG. 2B shows modal waveforms obtained by decomposing the waveform in FIG. 2A, FIG. 2C shows modal torsional vibration waveforms at an arbitrary position $x_j$, which are obtained by arithmetically operating the waveforms in FIG. 2B, FIG. 2D shows a torsional vibration waveform at the arbitrary position $x_j$ obtained by composing the waveforms in FIG. 2C and FIG. 2E shows a stress waveform at the arbitrary position $x_j$, FIG. 5 is a block diagram showing the embodiment in FIG. 4.

DESCRIPTION OF THE PREFERRED EMBODIMENT

The present invention will be described in detail with reference to FIGS. 1 through 3 and FIGS. 4 and 5 showing one embodiment of the present invention.

Figure 4:
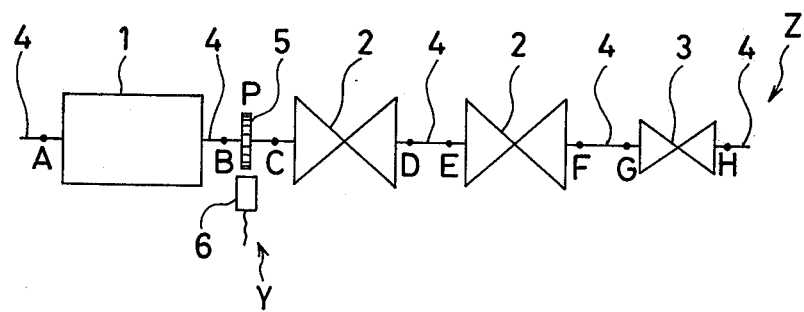
FIG. 4 is a schematic illustration of a turbine generator showing an embodiment of the present invention.

In FIG. 4, a reference numeral 1 is a generator, reference numerals 2 and 3 are low pressure turbines and a high pressure turbine, respectively, for driving the generator 1. A reference numeral 4 shows rotating shafts connecting between the generator 1, the low pressure turbines 2 and the high pressure turbine 3. The rotating shafts 4 are arranged in series to constitute a rotating shaft system (Z). A reference numeral 5 is one of five (5) turning gears provided at five (5) certain positions PK (k=1, 2, 3, 4 and 5, the coordinates being represented by $x_{pk}$) on the rotating shafts 4, respectively, and a reference numeral 6 is a pickup for detecting, in cooperation with the turning gear 5, a torsional vibration of the rotating shafts 4, each constituting a detector Y for transient torsional vibration of the shaft. In this case, with a suitably increased number of certain positions, the detection preciseness may be increased.

Arbitrary positions A to H are set on the rotating shafts at which the torsional vibrations are to be monitored, the coordinates thereof being $x_A$ to $x_H$. The coordinates are generally represented as $x_j$. Therefore, since the position $x_j$ can be selected arbitrarily, the selections of the monitoring positions and the number of the monitoring positions are arbitrary.

The torsional vibration $Y(x_{pk}, t)$ detected at the certain position $x_{pk}$ by the detector Y is shown in FIG. 2A where t is time. The modal vibrations $Y_i(x_{pk}, t)$ at the certain position $x_{pk}$ are shown in FIG. 2B.

Referring to FIG. 5, a reference numeral 11 shows five sets of multipliers, each set including five multipliers, connected to different one of the detectors Y. The multipliers 11 function to multiply previously obtained constants ($G_{11}$, $G_{12}$ ... $G_{15}$), ($G_{21}$, $G_{22}$ ... $G_{25}$), ... ($G_{51}$, $G_{52}$ ... $G_{55}$) to the torsional vibrations detected by the detectors Y, respectively. A reference numeral 12 shows adders each operating to add outputs of the corresponding multipliers 11 of the five sets. The multipliers 11 and the adders 12 constitute a matrix arithmetic unit 10 for obtaining a general vibration mode component $H_i(t)$. For example, $$H_1(t) = \Sigma G_{1k} Y(x_{pk},t)$$
$$H_2(t) = \Sigma G_{2k} Y(x_{pk},t)$$
$$\vdots$$
$$H_5(t) = \Sigma G_{5k} Y(x_{pk},t)$$

A reference numeral 13 shows accumulators each of which functions to obtain the modal vibration $Y_i(x_j,t)$ at the arbitrary position $x_j$ shown in FIG. 2C by multiplying the i th vibration mode component $H_i(t)$ to the i th vibration mode type $G_i(x_j)$ at the arbitrary position $x_j$. A reference numeral 14 shows each adder which summates the outputs of the accumulators 13 at the arbitrary positions $x_j$. The accumulators 13 and the adders 14 constitute a modal arithmetic unit 15 by which the torsional vibration $Y(x_j,t)$ (see, FIG. 2D) at the arbitrary position $x_j$ is obtained.

According to the embodiment of the present invention having construction mentioned as above, the torsional vibrations produced in the rotating shaft system Z are detected at the certain positions $x_{pk}$ as the torsional vibrations $Y(x_{pk},t)$ and the torsional vibration $Y(x_j,t)$ at the arbitrary position is estimated through the matrix arithmetic unit 10 and the modal arithmetic unit 15. That is, the pickups are provided at a small number (five in this embodiment) of certain positions on the rotating shaft and the torsional vibrations at only the certain position are detected, from the results of which the torsional vibration at other arbitrary positions where pickups should otherwise be required are estimated. Therefore, the cost can be much reduced in comparison with the case where the pickups are set at all of the required positions.

A method of obtaining a fatigue expenditure life of an arbitrary position of the rotating shaft system by utilizing the present invention and a method of monitoring abnormal huge vibration due to an external force exerted by such causes as thunder to which the present invention can not be applied will be described.

A stress due to the torsional vibration produced in the rotating shaft system is proportional to the amplitude of the vibration. Therefore, assuming a proportion constant at an arbitrary position $x_j$ as $\alpha_j$, the stress $\sigma_j$ at the arbitrary position $x_j$ can be shown as in FIG. 2E and represented by using the torsional vibration $Y(x_j, t)$ at the arbitrary position $x_j$ obtained by the present apparatus as follows:

$$\sigma_j = \alpha_j \cdot Y(x_j, t) \qquad (8)$$
$$= \sum_{i=1} \alpha_j G_i(x_j) \cdot H_i(t)$$

With the stress $\sigma_j$ at the arbitrary position $j$ of the rotating shaft system $Z$ determined as above, it is possible to calculate it by using the S-N diagram (stress magnitude—fatigue repetition number diagram) of material on the basis of the known fatigue life estimation. In the present invention, it is performed by the Range-pair counting method. Describing the Range-pair counting method, it is assumed that the stress at the arbitrary position $j$ is obtained by the equation (8) (see FIG. 2E). Furthermore, assuming that extreme values in the equation (8) are represented, from that of the shortest time, by $\sigma_j^{(1)}$, $\sigma_j^{(2)}$, ..., a difference $\Delta\overline{\sigma}_j^{(k)}$ of the stress waveform amplitude between the k-th extreme value and the (k+1)th extreme value and a mean stress $\sigma_j^{(k)}$ thereof are represented by $$\Delta\sigma_j^{(k)} = \tfrac{1}{2}|\sigma_j^{(k)} - \sigma_j^{(k+1)}| \qquad (9)$$

$$\overline{\sigma}_j^{(k)} = \tfrac{1}{2}|\sigma_j^{(k)} + \sigma_j^{(k+1)}| \qquad (10)$$

respectively.

A stress difference $\Delta\sigma_{eqj}^{(k)}$ equivalent to the case where the mean stress is zero can be represented according to the modified Goodman chart by $$\Delta\sigma_{eqj}^{(k)} = \sigma_j^B \cdot \Delta\sigma_j^{(k)}/(\sigma_j^B - \overline{\sigma}_j^{(k)}) \qquad (11)$$

where $\sigma_j^B$ is a tension strength of the rotating shaft at the arbitrary position $j$ thereof.

Figure 1:
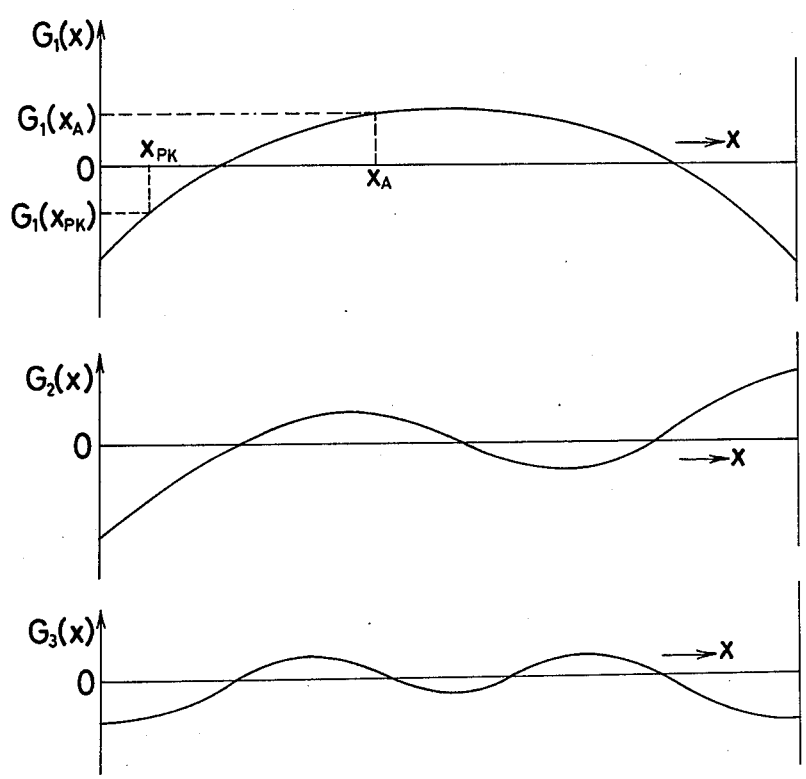
FIG. 1 is an explanatory waveforms of vibration mode types of a rotating shaft system.
Figure 3:
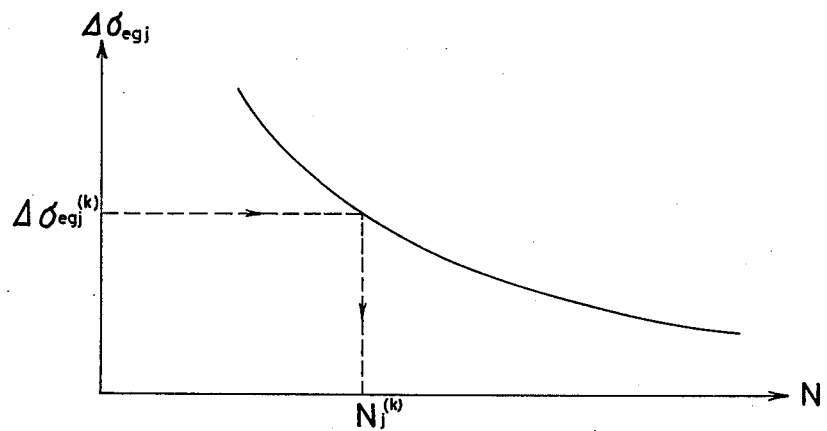
FIG. 3 is an S-N (stress amplitude—fatigue repetition number) diagram.

Thus, by knowing the equivalent stress difference $\Delta\sigma_{eqj}^{(k)}$ between those at the k-th and the (k+1)th extremes of the stress waveform at the arbitrary position $j$ on the rotating shaft system $Z$, the number $N_j^{(k)}$ of the repetitive applications of the equivalent stress difference $\Delta_{eqj}^{(k)}$ to the arbitrary position $j$ prior to a breakdown of the shaft can be known from the S-N diagram (FIG. 3). Therefore, by deeming that the variation of the stress is a half of a cycle of the stress wave, an expenditure $\Delta D_j^{(k)}$ of the shaft life due to the shift from the extreme value $\sigma_j^{(k)}$ to $\sigma_j^{(k+1)}$ is represented by $$\Delta D_j^{(k)} = 1/(2 \cdot N_j^{(k)}) \qquad (12)$$

Accordingly, the variation of the stress at the arbitrary position $j$ of the rotating shaft system is computed according to the equation (8), the extreme values are counted and the expenditure $\Delta D_j^{(k)}$ of the life is computed and accumulated according to the equations (9) to (12).

That is, the resultant accumulation $D_j$ can be represented by $$D_j = \sum_k^n \Delta D_j^{(k)} = \sum_k^n 1/(2N_j^{(k)}) \qquad (13)$$

and it indicates the amount of expenditure of the life until the stress extremes occur (n+1) times at the arbitrary position $j$ on the rotating shaft system.

On the other hand, in a case where a huge vibration occurs in the rotating shaft system due to an external force produced by such as thunder in the vicinity of the shaft system, it may be possible to perform a high precision analysis on the basis of the present monitoring system together with non-linearity theory, plastic deformation theory, to thereby make it useful to estimate the torsional vibration and the fatigue life. At the same time, it may be possible to use it to collect data necessary to maintain and design the rotating shaft system such as the frequency of the external force exertion on the system and the kinds of the torsional vibration occurred in the system. In such case as above, a stress which it to be used as a reference is firstly set and then the reference stress is compared with a stress obtained from the torsional vibration obtained by the apparatus. When the stress exceeds the reference stress, the external force exerted on the rotating shaft system and torsional vibration at a certain position at that time are recorded as more precise data which may be analysed at later time by using a large computer. Therefore, there is no need of recording all data for a long period of time, resulting in an economical advantages.

What is claimed is:

1. In an apparatus for monitoring torsional vibration in which a torsional vibration at an arbitrary position on a rotating shaft system is measured from a torsional vibration detected at a certain position on the rotating shaft system on the basis of the facts that a torsional vibration occurred in the rotating shaft system is a sum of modal vibrations and the modal vibration can be represented by a product of a vibration mode type and a vibration mode component, the improvement comprising n sets of detectors for detecting torsional vibrations at each of n certain positions on the rotating shaft system, a matrix arithmetic unit for multiplying previously obtained n sets of n constants to the n sets of torsional vibrations obtained by said detectors, respectively, and for adding the results of the multiplications to obtain n vibration mode components and a modal arithmetic unit for multiplying the n vibration mode components to vibration mode types at arbitrary position on the rotating shaft system and for adding them to obtain torsional vibrations at the arbitrary positions.

2. A method of monitoring torsional vibrations of a rotating shaft system comprising the steps of measuring the under-formulated torsional vibrations $Y(x_{pk}, t)$ at a number n of certain positions $x_{pk}$ on the rotating shaft system to develop representative signals, said measurements being made with the assumptions that a torsional vibration occurring in the rotating shaft system is a sum of modal vibrations, that each of the modal vibrations is a product of a vibration mode type $G_i(x_{pk})$ and a vibration mode component $H_i(t)$ and that the torsional vibration is an accumulation of the modal vibrations up to the n-th modal vibration, $$Y(x_{pk}, t) = \Sigma G_i(x_{pk}) \cdot H_i(t)$$

$(k = 1, 2, \ldots, n);$ obtaining an unknown value as said vibration mode component, $H_i(t)$ by the use of intermediate signals representing the reverse matrix $G_{ik}$ of n row-n column matrix having the previously obtained and afore-formulated coefficient, $G_i(x_{pk})$ as its element, namely, $$[G_{ik}] \equiv [G_i(x_{pk})]^{-1},$$

said reverse matrix $G_{ik}$ being responsive to said representative signals wherein i shows the row and k shows the column, and obtaining torsional vibration $Y(x_j,t)$ from said intermediate signals at an arbitrary position $x_j$ on the rotating shaft system as an accumulation $Y(x_j,t) = \Sigma G_i(x_j) \cdot H_i(t)$ of products of the vibration mode type $G_i(x_j)$ at said arbitrary position $x_j$ already known and the vibration mode component $H_i(t)$.

* * * * *